United States Patent
Nakashita et al.

(10) Patent No.: US 7,401,842 B2
(45) Date of Patent: Jul. 22, 2008

(54) RESIN PANEL AND AUTOMOBILE DOOR

(75) Inventors: Takayuki Nakashita, Hiroshima (JP); Kenji Fujimoto, Hiroshima (JP)

(73) Assignee: Daikyo Nishikawa Corporation, Hiroshima (JP)

( * ) Notice: Subject to any disclaimer, the term of this patent is extended or adjusted under 35 U.S.C. 154(b) by 0 days.

(21) Appl. No.: 11/636,649

(22) Filed: Dec. 11, 2006

(65) Prior Publication Data

US 2007/0145769 A1   Jun. 28, 2007

(30) Foreign Application Priority Data

Dec. 26, 2005   (JP)   ............................. 2005-372608

(51) Int. Cl.
*B62D 25/02* (2006.01)
(52) U.S. Cl. ................. 296/146.6; 296/146.5; 296/191; 296/901.1
(58) Field of Classification Search ............ 296/901.01, 296/146.5, 146.6, 191, 202, 203.03; 49/502
See application file for complete search history.

(56) References Cited

U.S. PATENT DOCUMENTS

| 662,567 | A | * | 11/1900 | Von Lipowska et al. ..... 428/604 |
| 3,964,208 | A | * | 6/1976 | Renner et al. ................. 49/502 |
| 4,662,115 | A | * | 5/1987 | Ohya et al. .................... 49/502 |
| 6,447,047 | B1 | * | 9/2002 | Marcovecchio et al. .. 296/146.7 |
| 6,898,901 | B2 | * | 5/2005 | Petroski et al. ............... 49/502 |
| 6,968,650 | B2 | * | 11/2005 | Seksaria et al. ............... 49/502 |
| 7,198,319 | B2 | * | 4/2007 | Schroder et al. ......... 296/146.7 |

FOREIGN PATENT DOCUMENTS

JP          11-179751          7/1999

* cited by examiner

*Primary Examiner*—Dennis H. Pedder
*Assistant Examiner*—Mike Hernandez
(74) *Attorney, Agent, or Firm*—Studebaker & Brackett PC; Donald R. Studebaker

(57) ABSTRACT

A plate body includes: an inner bulge protruded on one side of the panel body and recessed on the other side and has a periphery spaced from attachment parts; connector bulges having a certain width protruded on the one side of the plate body and recessed on the other side and connect the periphery of the inner bulge to the attachment parts; and an outer bulge recessed on the one side of the plate body and protruded on the other side and continuous with the inner bulge, the connector bulges and the attachment parts. The inner bulge, the connector bulges and the outer bulge of the plate body are expansion-molded and include a skin layer formed on the surface and has high resin density and an expanded layer formed therein and has a plurality of voids and low resin density relative to the skin layer.

4 Claims, 4 Drawing Sheets

RESIN PANEL AND AUTOMOBILE DOOR

CROSS-REFERENCE TO RELATED APPLICATION

This non-provisional application claims priority under 35 U.S.C. §119(a) of Japanese Patent Application No. 2005-372608 filed in Japan on Dec. 26, 2005, the entire contents of which are hereby incorporated by reference.

BACKGROUND OF THE INVENTION

1. Field of the Invention

The present invention relates to a resin panel in which a skin layer is formed on its surface and an expanded layer having a plurality of voids is formed therein. The invention also relates to an automobile door using the resin panel.

2. Description of Related Art

Japanese Unexamined Patent Publication No. H11-179751 discloses a molded resin body including a skin layer formed on its surface and an expanded layer having a plurality of voids formed therein. According to the literature, the molded resin body is obtained using a mold assembly which consists of a moving mold containing a movable mold inside and a stationary mold. Specifically, a fiber-filled thermoplastic resin is filled by injection in a cavity of the mold assembly in a closed state and the movable mold is retracted in the moving mold to increase the cavity volume in the course of solidification of the fiber-filled thermoplastic resin, thereby allowing the fiber-filled thermoplastic resin to expand. The molded resin body is in the form of a panel and the entire region of the panel is made of the expanded layer for weight reduction. The H 11-179751 literature also describes that integral convex parts are formed on the surface of the molded resin body and a layer harder than the expanded layer is formed in parts of the molded resin body corresponding to the convex parts so that the parts of the molded resin body around the convex parts are improved in strength and rigidity.

In some cases, the molded resin body is in the form of a flat panel and provided with integral attachment parts for fixing the panel to a target object. In this case, if the panel is configured as disclosed in the H11-179751 literature, the hard layer provided in the parts of the panel body corresponding to the attachment parts is still an expanded layer, though it is harder than the expanded layer in the other parts of the panel body. Therefore, the parts of the panel body around the attachment parts as well as the panel body itself may not provide adequate strength and rigidity. Worse still, torsional rigidity and bending rigidity may be insufficient. In such a situation, the resin panel cannot be fixed to the target object with stability.

SUMMARY OF THE INVENTION

In view of the above, the present invention has been achieved. The present invention relates to an expansion-molded resin panel and an object of the invention is to improve the strength and rigidity of a panel body of the resin panel so that the resin panel is fixed to a target object with stability.

In order to achieve the object, the present invention has refined the surface structure of the panel body.

More specifically, the present invention is directed to a resin panel including a flat panel body and a plurality of integral attachment parts formed near the periphery of the flat panel body for fixing the panel body to a target object, as well as an automobile door. In the present invention, the following solutions are taken.

To be more specific, the first and second solutions of the invention are directed to the resin panel. According to the first solution of the invention, the panel body includes: an inner bulge which is protruded on one side of the panel body and recessed on the other side and has a periphery spaced from the attachment parts; connector bulges having a certain width which are protruded on the one side of the panel body and recessed on the other side and connect the periphery of the inner bulge to the attachment parts; and an outer bulge which is recessed on the one side of the panel body and protruded on the other side and continuous with the inner bulge, the connector bulges and the attachment parts, and the inner bulge, the connector bulges and the outer bulge of the panel body are made of a skin layer formed on the surface and has high resin density and an expanded layer formed therein and has a plurality of voids and low resin density relative to the skin layer, the skin layer and the expanded layer being prepared by expanding a fiber-filled thermoplastic resin filled by injection in a cavity of a mold assembly by increasing the volume of the cavity in the course of solidification of the fiber-filled thermoplastic resin.

According to the second solution of the invention related to the first solution, each of the attachment parts is made of a solid layer and provided with a through hole penetrating the panel body for receiving a fastening.

The third solution of the invention relates to an automobile door comprising a door body including a door outer panel and a door inner panel, a carrier plate fixed to the door inner panel and a door trim fixed to the door inner panel to cover the carrier plate from the cabin side, wherein the carrier plate is the resin panel of claim 1 or 2.

According to the first solution of the invention, the skin layer is formed on the surface of the panel body and the expanded layer having a plurality of voids is formed therein. Thus, the resin panel is reduced in weight.

Further, the attachment parts are connected to the inner bulge via the connector bulges, the inner bulge and the connector bulges are protruded toward the same direction from the panel surface, while the outer bulge is protruded in the direction opposite to the protruding direction of them from the panel surface. Therefore, parts of the panel body around the attachment parts are improved in strength and rigidity. Moreover, the panel itself is improved in strength and rigidity, especially in torsional and bending rigidity. This makes it possible to fix the resin panel to the target object with stability.

According to the second solution of the invention, the attachment parts are made of a hard solid layer. Therefore, even if the through holes are formed therein to penetrate the panel body, the strength and rigidity of the attachment parts are sufficiently maintained.

According to the third solution of the invention, it is possible to provide an automobile door including a lightweight carrier plate improved in strength and rigidity, especially in torsional and bending rigidity.

DETAILED DESCRIPTION OF THE INVENTION

Hereinafter, an embodiment of the present invention is explained with reference to the drawings.

Figure 6:
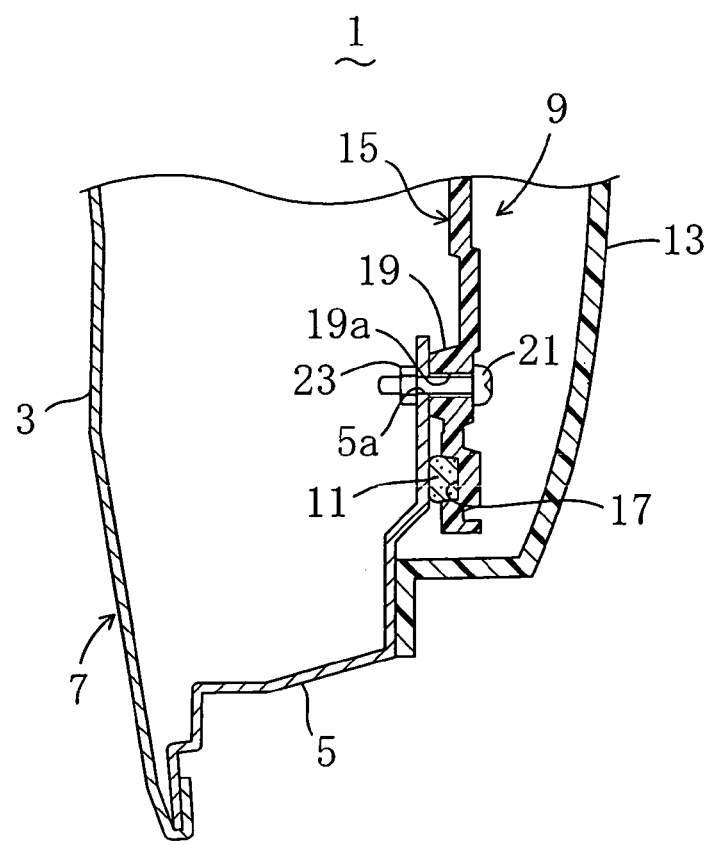
FIG. 6 is a sectional view of an automobile door corresponding to the sectional view taken along the line II-II of FIG. 1.

FIG. 6 is a sectional view of a side door 1 of an automobile. The side door 1 includes a metallic door body 7 including a door outer panel 3 and a door inner panel 5. A resin carrier plate (door module) 9, which is a resin panel according to the embodiment of the present invention, is fixed to the door inner panel 5 (target object) of the door body 7 via a sealant 11. A door trim 13 is also fixed to the door inner panel 5 to cover the carrier plate 9 from the cabin side.

Figure 1:
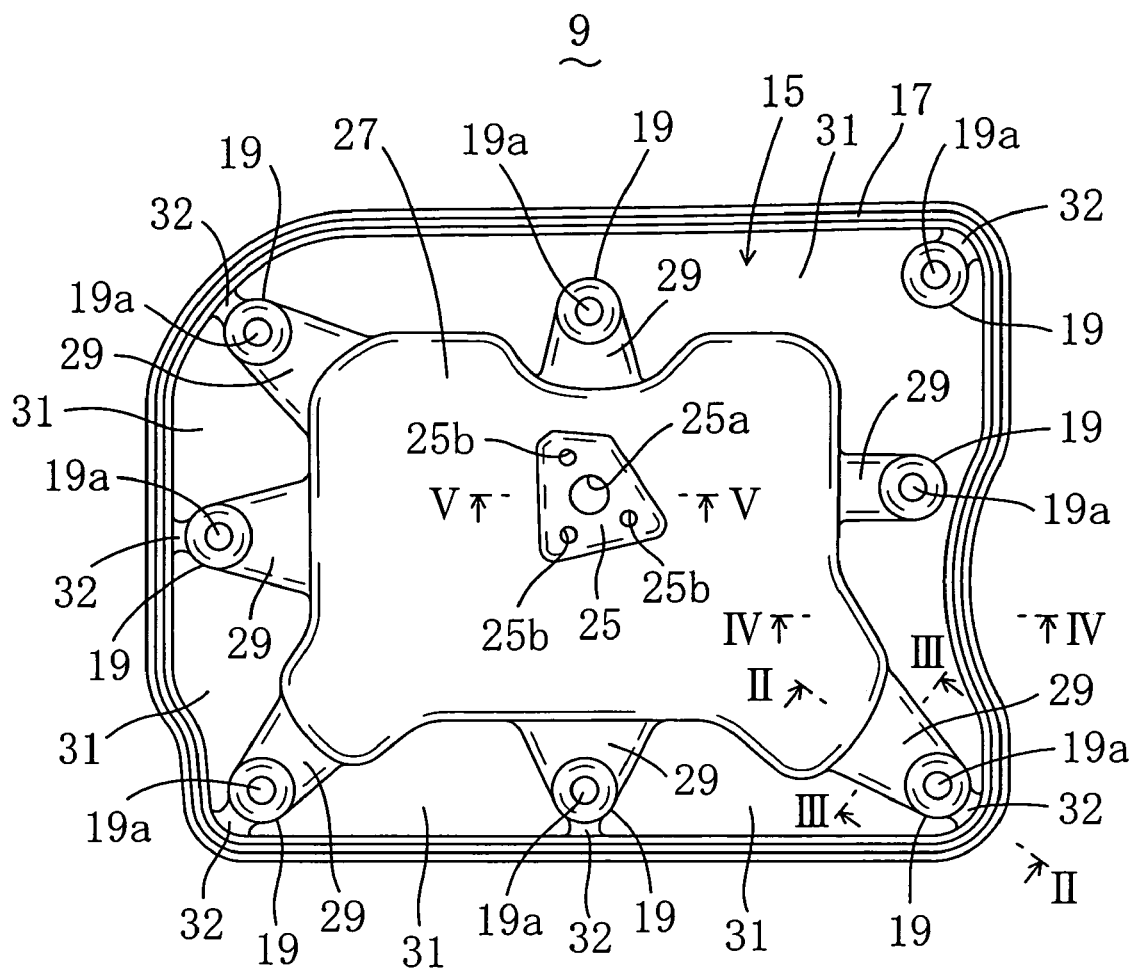
FIG. 1 is a front view of a carrier plate observed from outside the cabin.
Figure 2:
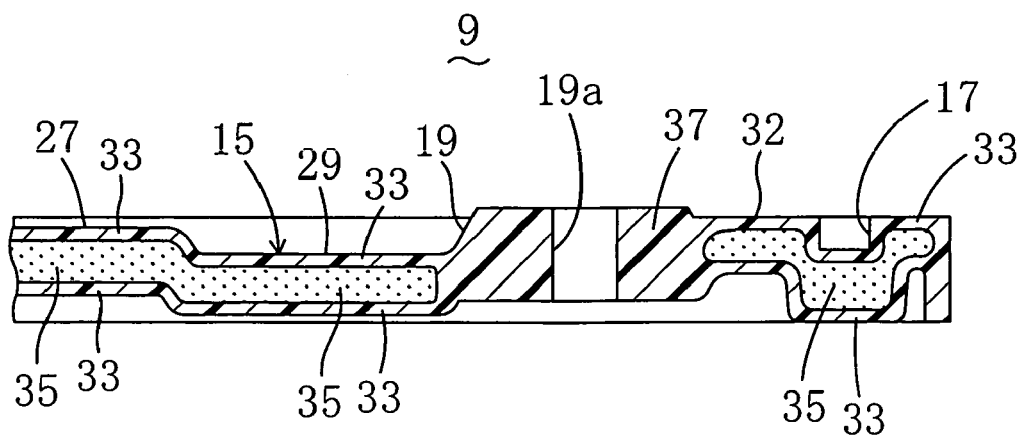
FIG. 2 is a sectional view taken along the line II-II of FIG. 1.
Figure 3:
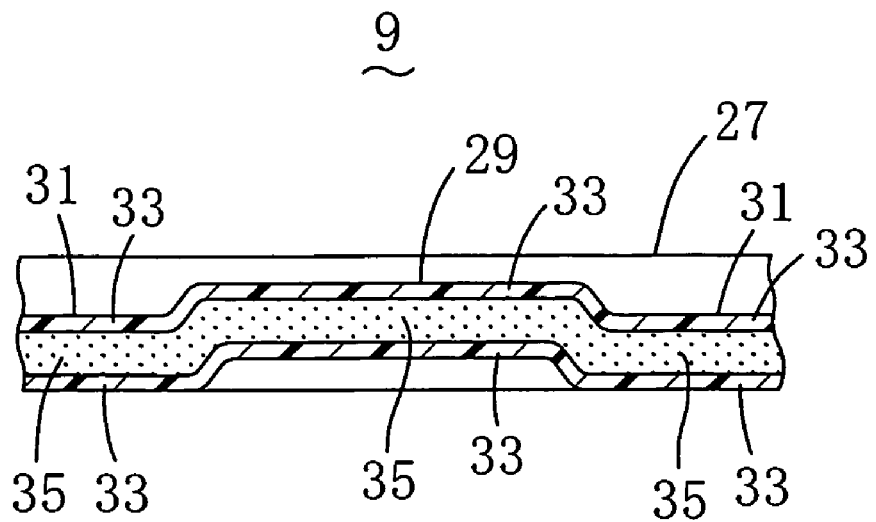
FIG. 3 is a sectional view taken along the line III-III of FIG. 1.
Figure 4:
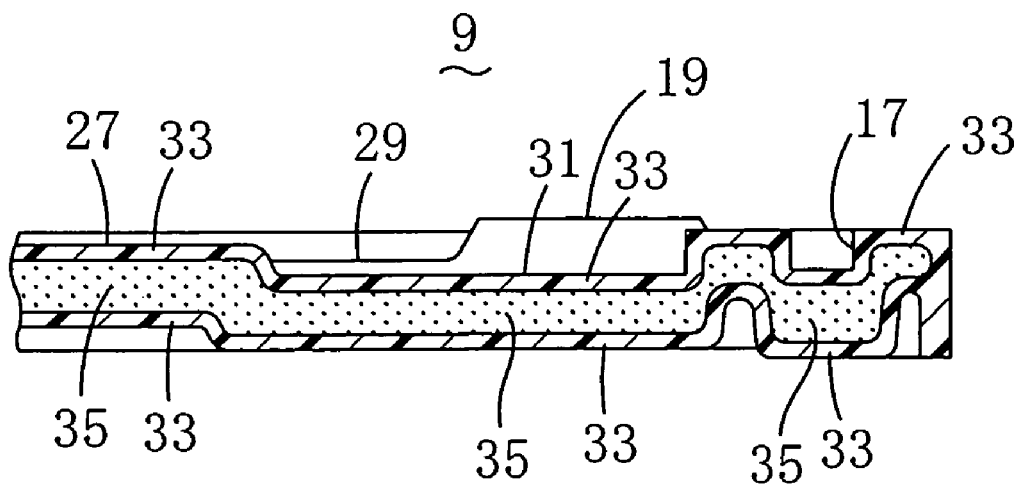
FIG. 4 is a sectional view taken along the line IV-IV of FIG. 1.
Figure 5:
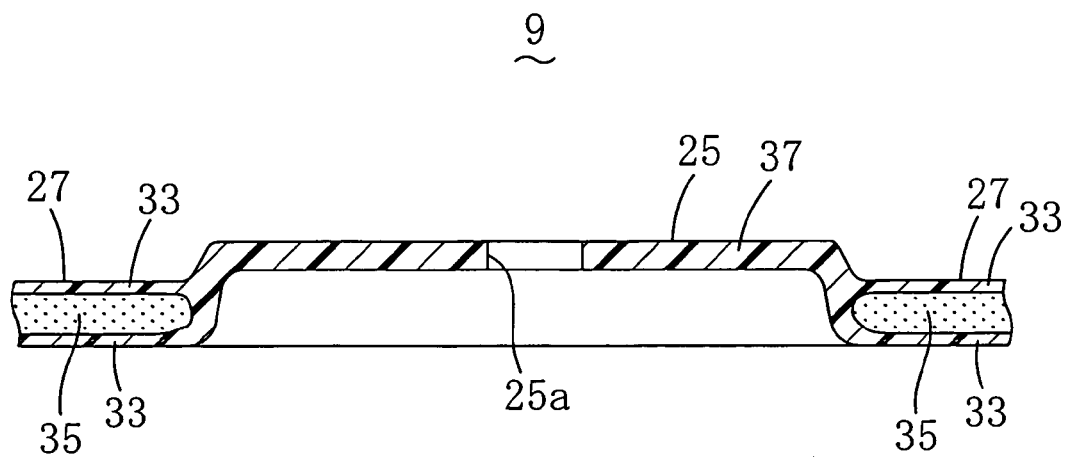
FIG. 5 is a sectional view taken along the line V-V of FIG. 1.

The carrier plate 9 is a molded article made of a fiber-filled thermoplastic resin and includes a plate body 15 serving as a panel body. A sealing groove 17 for holding the sealant 11 is formed in one of the sides of the plate body 15 (outer side opposite the cabin) along the periphery thereof as shown in FIG. 1. Further, attachment parts 19 for fixing the plate body 15 to the door inner panel 5 are formed near the periphery of the plate body 15 (to be positioned more inside than the sealing groove 17) at certain intervals along the entire circumference thereof and through holes 19a for receiving fastenings are formed in the attachment parts 9 to penetrate the plate body 15.

Then, the carrier plate 9 is laid over the door inner panel 5 in such a manner that the through holes 19a of the attachment parts 19 are aligned with a plurality of bolt insertion holes 5a formed in the door inner panel 5. Bolts 21 are then inserted into the through holes 19a and the bolt insertion holes 5a from the cabin side to be screwed in weld nuts 23 welded to the outer side of the door inner panel 5 opposite the cabin. Thus, the carrier plate 9 is fixed to the door inner panel 5 (see FIG. 6).

Another attachment part 25 for fixing a motor for lifting/lowering a window pane (not shown) is formed roughly in the center of the plate body 15. The attachment part 25 is substantially triangular when viewed in plan as shown in FIG. 1. In the attachment part 25, a round motor mounting hole 25a is formed to penetrate the plate body 15 and three through holes 25b for receiving screws are formed to penetrate the plate body 15 at positions corresponding to the vertexes of the triangle around the motor mounting hole 25a.

As shown in FIGS. 1 to 5, the plate body 15 has an inner bulge 27 which is protruded on one side of the plate body 15 (outer side opposite the cabin) and recessed on the other side (inner side facing the cabin) and has a periphery spaced from the attachment parts 19. The inner bulge 27 is substantially rectangular when viewed in plan.

The periphery of the inner bulge 27 and the attachment parts 19 (except one of them at the upper right corner of FIG. 1) are connected via connector bulges 29 having a certain width which are protruded on the one side of the plate body 15 (outer side opposite the cabin) and recessed on the other side (inner surface facing the cabin). Each of the connector bulges 29 is triangular when viewed in plan.

The inner bulge 27 and the connector bulges 29 are protruded toward the same direction from the panel surface (the direction opposite to the cabin). The amount of protrusion of inner bulge 27 is greater than that of the connector bulges 29.

A portion for forming the sealing groove 17 is also protruded on the outer side opposite the cabin. The portion for forming the sealing groove 17 and the attachment parts 19 (except one of them at the right middle of FIG. 1 in the vertical direction) are connected via bridge parts 32.

Further, an outer bulge 31 which is recessed on the one side of the plate body 15 (outer side opposite the cabin) and protruded on the other side (inner side facing the cabin) is formed continuously with the inner bulge 27, the connector bulges 29, the attachment parts 19, the portion for forming the sealing groove 17 and the bridge parts 32. Specifically, the outer bulge 29 is protruded in the direction opposite to the protruding direction of the inner bulge 27 and the connector bulges 29 from the panel surface (toward the inside of the cabin).

The inner bulge 27, the connector bulges 29, the outer bulge 31, the bridge parts 32 and the portion for forming the sealing groove 17 of the plate body 15 are made of a hard skin layer 33 formed on the surface and has no voids and high resin density and an expanded layer 35 formed therein and has a plurality of voids (not shown) and low resin density relative to the skin layer 33 as shown in FIGS. 2 to 5. This structure is obtained by expanding a fiber-filled thermoplastic resin R filled by injection in a cavity of a mold assembly 39 mentioned later by increasing the volume of part of the cavity corresponding to part of the plate body 15 excluding portions for forming the attachment parts 19 and 25 in the course of solidification of the fiber-filled thermoplastic resin R. In FIG. 6, the plate body 15 is depicted as a single layered article for convenience sake.

In contrast, the attachment parts 19 and 25 are made of a hard solid layer 37 in which the expanded layer 35 is not formed because the volume of part of the cavity corresponding to the attachment parts 19 and 25 is not increased during the expansion molding. Although the attachment parts 19 and 25 are both made of the solid layer 37, each of the attachment parts 19 is made thicker than the other part surrounding it (see FIG. 2) and the attachment part 25 is made thinner than the other part surrounding it (see FIG. 5).

Figure 7A:
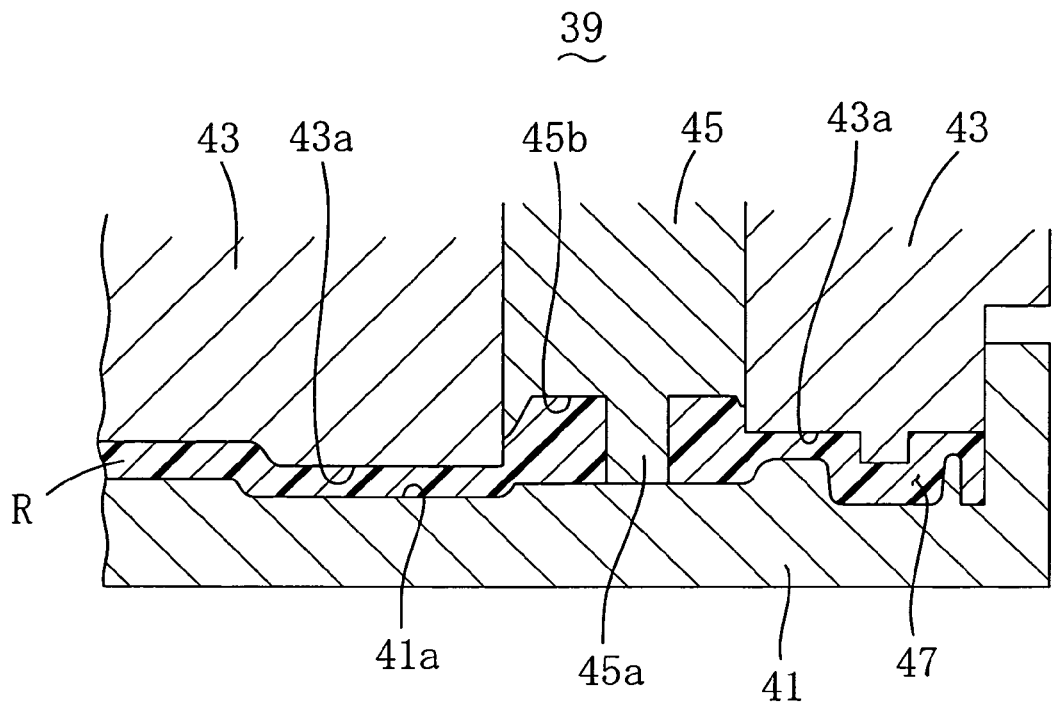
FIG. 7A is a sectional view corresponding to FIG. 2 illustrating a mold assembly whose cavity is filled with a fiber-filled thermoplastic resin by injection and FIG. 7B is a sectional view of the mold assembly in which a movable mold is slightly retracted to expand the cavity volume.
Figure 7B:
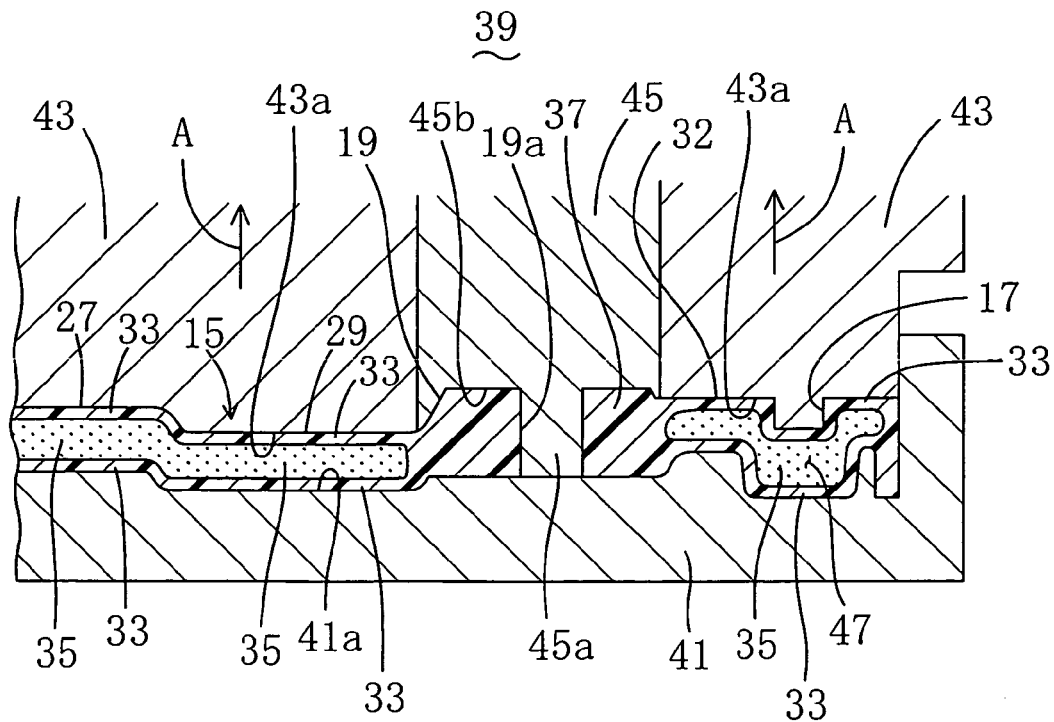

The thus-configured carrier plate 9 is molded using a mold assembly 39 shown in FIGS. 7A and 7B.

The mold assembly 39 consists of a stationary mold 41 whose molding surface 41a corresponds to the configuration of the side of the plate body 15 facing the cabin, a movable mold 43 which is opposed to the stationary mold 41 to be able to move back and forth with respect to the stationary mold 41 and has a molding surface 43a corresponding to the configuration of part of the side of the plate body 15 opposite the cabin excluding the attachment parts 19 and 25, a slidable mold 45 for forming the attachment parts 19 and a slidable mold (not shown) for forming the attachment part 25 arranged on the same side as the movable mold 43. In FIGS. 7A and 7B, reference numeral 45a indicates a protrusion projecting from a molding surface 45b of the slidable mold 45 for forming the through hole 19a in the attachment part 19.

As shown in FIG. 7A, first, the mold assembly 39 is closed while the slidable mold 45 is moved forward until the protrusion 45a abuts the molding surface 41a of the stationary mold 41.

Then, the fiber-filled (e.g., glass fiber-filled) thermoplastic resin R (e.g., a fiber-filled polypropylene resin) is injected into a cavity 47 in the mold assembly 39 from an injector (not shown) to fill the cavity 47.

After that, in the course of solidification of the fiber-filled thermoplastic resin R in the cavity 47 of the mold assembly 39, i.e., when a skin layer 33 is formed in a portion of the fiber-filled thermoplastic resin R located near the molding surfaces 41a and 43a of the mold assembly 39 (stationary and movable molds 41 and 43) in the cavity 47, only the movable mold 43 is retracted in the mold opening direction A without retracting the slidable mold 45 as shown in FIG. 7B. To be more specific, the movable mold 43 is slightly shifted away from the stationary mold 41, thereby making the cavity volume two or more times larger.

At this time, a portion of the fiber-filled thermoplastic resin R in contact with the molding surfaces 41a and 43a of the mold assembly 39 (stationary and movable molds 41 and 43) is early cooled owing to the mold temperature to become a hard skin layer 33 containing no voids therein as a surface layer. On the other hand, the inside of the fiber-filled thermoplastic resin R is insusceptible to the mold temperature and in a gel form having high viscosity.

Therefore, when the cavity volume is enlarged, the fiber-filled thermoplastic resin R which has been compressed by the stationary and movable molds 41 and 43 is pulled by the molding surface 43a of the movable mold 43 to expand. Simultaneously, the fiber-filled thermoplastic resin R is relieved of the compression and elastically restore. This elastic restoring force (spring-back action) also causes the thermoplastic resin R to expand. Thus, the plate body 15 is obtained by expansion in which the hard skin layer 33 having no voids is formed as the surface layer and the expanded layer 35 containing a plurality of voids (not shown) is formed therein.

At this time, even when the movable mold 43 is retracted to increase the cavity volume below it, the slidable mold 45 is not retracted and the cavity volume below it is not increased. Therefore, portions of the fiber-filled thermoplastic resin R in the cavity 47 corresponding to the attachment parts 19 for fixing the carrier plate 9 and the attachment part 25 for fixing a motor for lifting/lowering a window pane are not pulled up, remaining still. As a result, the attachment parts 19 and 25 made of the hard solid layer 37 are formed integrally with the plate body 15.

The expansion-molded plate body 15 of the carrier plate 9 includes, the inner bulge 27, the connector bulges 29, the sealing groove 17 and the bridge parts 32 which are protruded in the same direction from the panel surface (in the direction opposite to the cabin) and the outer bulge 31 which is protruded in the direction opposite to the protruding direction of them from the panel surface (toward the inside of the cabin).

Thus, the obtained carrier plate 9 is reduced in weight as compared with a carrier plate in which the plate body is solely made of a solid layer having no expanded layer therein and the thickness of the plate body is the same as that of the plate body 15 of the present embodiment.

As described above, the attachment parts 19 are connected to the inner bulge 27 through the connector bulges 29 and the inner bulge 27 and the connector bulges 29 are protruded in the direction opposite to the protruding direction of the outer bulge 31 with respect to the plate surface of the plate body 15. Therefore, part of the plate body 15 around each attachment part 19 is improved in strength and rigidity. Further, the carrier plate 9 itself is also improved in strength and rigidity, especially in torsional and bending rigidity. This makes it possible to fix the carrier plate 9 to the door inner panel 5 with stability. In particular, when a motor for lifting/lowering a window pane and a rail for lifting/lowering the window pane which are quite heavy are attached to the carrier plate 9 as mentioned in the present embodiment, a bending load is applied to the carrier plate 9. Even in such a case, the carrier plate 9 is prevented from being bent (warped) because the attachment parts 19 and 25 are connected via the inner bulge 27 and the connector bulges 29.

Further, since the attachment parts 19 are made of a solid layer, the strength and rigidity thereof are sufficiently maintained even if the through holes 19a for receiving fastenings are formed to penetrate the plate body 15. Likewise, since the attachment part 25 is also made of a solid layer, its strength and rigidity are sufficiently ensured even if the motor mounting hole 25a and the through holes 25a for receiving screws are formed to penetrate the plate body 15. Thus, the side door 1 of the automobile is provided with the lightweight carrier plate 9 having improved strength and rigidity. Moreover, since the attachment parts 19 and the portion for forming the sealing groove 17 are connected by the bridge parts 32 having the expanded layer 35, the strength and rigidity of the carrier plate 9 is further ensured.

In the above-described embodiment, a single attachment part 25 made of the solid layer 37 is formed in the inner bulge 27. However, the attachment part 25 made of the solid layer 37 may additionally be formed in other parts of the inner bulge 37 or it may not be formed at all. Also in the outer bulge 31, such an attachment part made of the solid layer 37 only may be formed and another bulge protruding in the same direction as the inner bulge 27 may be formed. Further, the bridge parts 32 having the expanded layer 35 may be made of the solid layer 37 only, just like the attachment parts 19.

In the above-described embodiment, a foaming agent may be added to the fiber-filled thermoplastic resin R. When the movable mold 43 is more retracted, i.e., the expansion rate is increased, in order to make the plate body 15 thicker in the retracting direction of the movable mold 43, and when the fiber-filled thermoplastic resin R is not expanded to a sufficient extent, the foaming agent preferably covers the lack of expansion by its expanding pressure so that the voids are surely generated. The foaming agent may be a chemical foaming agent which generates gas through chemical reaction or a physical foaming agent using inert gas such as carbon dioxide gas and nitrogen gas.

In the above-described embodiment, the resin panel is used as the carrier plate 9 of the side door 1 of an automobile. However, the resin panel may also be used as other automotive panels such as instrument panels, door trims, trunk boards and the like. Other than the automotive use, the resin panel may also be applied to home appliances and housing panels.

What is claimed is:

1. A resin panel comprising a flat panel body and a plurality of integral attachment parts formed near the periphery of the panel body for fixing the panel body to a target object, wherein the panel body includes: an inner bulge which is protruded on one side of the panel body and recessed on the other side and has a periphery spaced from the attachment parts;

connector bulges having a certain width which are protruded on the one side of the panel body and recessed on the other side and connect the periphery of the inner bulge to the attachment parts; and an outer bulge which is recessed on the one side of the panel body and protruded on the other side and continuous with the inner bulge, the connector bulges and the attachment parts, and the inner bulge, the connector bulges and the outer bulge of the panel body are made of a skin layer formed on the surface and has high resin density and an expanded layer formed therein and has a plurality of voids and low resin density relative to the skin layer, the skin layer and the expanded layer being prepared by expanding a fiber-filled thermoplastic resin filled by injection in a cavity of a mold assembly by increasing the volume of the cavity in the course of solidification of the fiber-filled thermoplastic resin.

2. The resin panel of claim 1, wherein each of the attachment parts is made of a solid layer and provided with a through hole penetrating the panel body for receiving a fastening.

3. An automobile door comprising a door body including a door outer panel and a door inner panel, a carrier plate fixed to the door inner panel and a door trim fixed to the door inner panel to cover the carrier plate from the cabin side, wherein the carrier plate is a resin panel comprising a flat panel body and a plurality of integral attachment parts formed near the periphery of the panel body for fixing the panel body to the door inner panel, wherein the panel body includes: an inner bulge which is protruded on one side of the panel body and recessed on the other side and has a periphery spaced from the attachment parts;

connector bulges having a certain width which are protruded on the one side of the panel body and recessed on the other side and connect the periphery of the inner bulge to the attachment parts; and an outer bulge which is recessed on the one side of the panel body and protruded on the other side and continuous with the inner bulge, the connector bulges and the attachment parts, and the inner bulge, the connector bulges and the outer bulge of the panel body are made of a skin layer formed on the surface having high resin density and an expanded layer formed therein having a plurality of voids and low resin density relative to the skin layer, the skin layer and the expanded layer being prepared by expanding a fiber-filled thermoplastic resin filled by injection in a cavity of a mold assembly by increasing the volume of the cavity in the course of solidification of the fiber-filled thermoplastic resin.

4. The automobile door of claim 3, wherein each of the attachment parts is made of a solid layer and provided with a through hole penetrating the panel body for receiving a fastening.

* * * * *